(12) United States Patent
Rame et al.

(10) Patent No.: US 12,454,891 B2
(45) Date of Patent: Oct. 28, 2025

(54) PROTECTION AGAINST OXIDATION OR CORROSION OF A HOLLOW PART MADE OF A SUPERALLOY

(71) Applicant: SAFRAN, Paris (FR)

(72) Inventors: Jérémy Rame, Moissy-Cramayel (FR); Amar Saboundji, Moissy-Cramayel (FR); Mirna Bechelany, Moissy-Cramayel (FR)

(73) Assignee: SAFRAN, Paris (FR)

( * ) Notice: Subject to any disclaimer, the term of this patent is extended or adjusted under 35 U.S.C. 154(b) by 312 days.

(21) Appl. No.: 18/040,767

(22) PCT Filed: Aug. 5, 2021

(86) PCT No.: PCT/FR2021/051444
§ 371 (c)(1),
(2) Date: Feb. 6, 2023

(87) PCT Pub. No.: WO2022/029388
PCT Pub. Date: Feb. 10, 2022

(65) Prior Publication Data
US 2023/0304409 A1    Sep. 28, 2023

(30) Foreign Application Priority Data
Aug. 6, 2020  (FR) .................................... 2008333

(51) Int. Cl.
*F01D 5/28*   (2006.01)
*B22C 3/00*   (2006.01)
(Continued)

(52) U.S. Cl.
CPC ................ *F01D 5/288* (2013.01); *B22C 3/00* (2013.01); *B22D 27/18* (2013.01); *C23F 11/18* (2013.01);
(Continued)

(58) Field of Classification Search
CPC ..................................... B22C 3/00; B22C 9/12
See application file for complete search history.

(56) References Cited

U.S. PATENT DOCUMENTS 3,824,113 A * 7/1974 Loxley et al. .......... C04B 41/51
427/431
5,756,223 A    5/1998 Cameron et al.
(Continued)

FOREIGN PATENT DOCUMENTS

CN       107737881 A      2/2018
DE   102007020638 A1 *  11/2008  ............. B22D 13/06
(Continued)

OTHER PUBLICATIONS

France Search Report and Written Opinion mailed Feb. 10, 2021, issued in Application No. FR2008333, filed Aug. 6 2020, 8 pages.
(Continued)

*Primary Examiner* — Topaz L. Elliott
(74) *Attorney, Agent, or Firm* — CHRISTENSEN O'CONNOR JOHNSON KINDNESS PLLC (57) ABSTRACT

A protection method, protects at least one hollow internal area of a turbine engine part made of a superalloy from oxidation and/or corrosion, wherein the at least one hollow inner area has been formed by means of at least one core made of a ceramic material limited by an external surface that surrounds it. Before bringing the superalloy around the core made of a ceramic material, the external surface is coated with a material that includes a nanometric layer of hafnium (Hf), and/or a micrometric layer of platinum (Pt), or mixture at least of hafnium and platinum.

9 Claims, 3 Drawing Sheets

(51) Int. Cl.
  *B22D 27/18* (2006.01)
  *C23F 11/18* (2006.01)

(52) U.S. Cl.
  CPC .... *F05D 2230/90* (2013.01); *F05D 2300/132* (2013.01); *F05D 2300/135* (2013.01); *F05D 2300/143* (2013.01); *F05D 2300/15* (2013.01); *F05D 2300/175* (2013.01); *F05D 2300/222* (2013.01)

(56) References Cited

U.S. PATENT DOCUMENTS

| | | | | |
|---|---|---|---|---|
| 5,931,214 | A * | 8/1999 | Spicer | B22D 27/08 |
| | | | | 164/136 |
| 5,993,980 | A | 11/1999 | Schmitz et al. | |
| 6,500,283 | B1 * | 12/2002 | Schaeffer | B22C 3/00 |
| | | | | 148/555 |
| 7,055,574 | B2 | 6/2006 | Strangman et al. | |
| 7,575,039 | B2 * | 8/2009 | Beals | B22C 9/10 |
| | | | | 164/369 |
| 2003/0075300 | A1 * | 4/2003 | Shah | B22C 9/103 |
| | | | | 164/369 |
| 2005/0241797 | A1 * | 11/2005 | Halberstadt | B22C 7/02 |
| | | | | 164/369 |
| 2009/0114797 | A1 * | 5/2009 | Beals | B22C 9/10 |
| | | | | 249/175 |
| 2011/0135446 | A1 * | 6/2011 | Dube | B22C 9/108 |
| | | | | 700/146 |
| 2012/0273153 | A1 | 11/2012 | Ahmad et al. | |
| 2014/0251572 | A1 * | 9/2014 | Vogt | B22D 27/15 |
| | | | | 164/513 |
| 2014/0356560 | A1 * | 12/2014 | Prete | C23C 28/36 |
| | | | | 416/241 B |
| 2016/0121390 | A1 * | 5/2016 | Oguma | B22C 9/12 |
| | | | | 164/369 |
| 2017/0333978 | A1 * | 11/2017 | Slavens | B05D 1/02 |
| 2020/0164431 | A1 * | 5/2020 | Walker | F01N 13/1861 |
| 2020/0276637 | A1 * | 9/2020 | Marcin | B22C 9/24 |

FOREIGN PATENT DOCUMENTS

| | | | |
|---|---|---|---|
| EP | 3 381 585 A1 | | 10/2018 |
| FR | 3113255 A1 | * | 2/2022 |
| GB | 1 419 896 A | | 12/1975 |
| WO | 2011008358 A1 | | 1/2011 |

OTHER PUBLICATIONS

International Search Report mailed Sep. 17, 2021, issued in corresponding International Application No. PCT/FR2021/051444, filed Aug. 5, 2021, 7 pages.

Written Opinion mailed Sep. 17, 2021, issued in corresponding International Application No. PCT/FR2021/051444, filed Aug. 5, 2021, 6 pages.

European Office Action mailed Feb. 14, 2024, issued in corresponding European Patent Application No. 21762511.0, filed Aug. 5, 2021, 12 pages.

He et al., "Influence of heat treatment on thermal cyclic fatigue of TBC systems", Surface and Coatings Technology, Oct. 5, 2019, 9 pages, vol. 379, Elsevier.

* cited by examiner

Fig. 1

Classes of materials in turbojet engines

PROTECTION AGAINST OXIDATION OR CORROSION OF A HOLLOW PART MADE OF A SUPERALLOY

FIELD OF THE DISCLOSURE

The disclosure relates to protection against oxidation and/or corrosion of at least one hollow inner area of a turbine engine part made of a superalloy.

Thus, a protection method is considered, as well as a monocrystalline part of a gas turbine engine for an aircraft made of a superalloy, and a foundry core which can be used to bring the material necessary for protection against oxidation and/or corrosion at the surface of the hollow inner area of the part.

BACKGROUND

Throughout this text, as conventionally, a superalloy, or high-performance alloy, is an alloy that features several high characteristics in terms of mechanical strength, resistance to thermal creep deformation, surface stability and resistance to corrosion or oxidation.

Its crystalline structure is typically face-centered cubic austenitic.

A superalloy comprises:
mainly (more than 50% by weight) an austenitic gamma matrix in which Ni can be substituted by Co, Cr, Mo, W, as well as by Nb, Al, Ti, Ta, Fe
gamma' ordered intermetallic precipitates: Ni3 (Ti,Al) or gamma Ni3Nb which occupy 30 to 70% of the volume and whose dimensions vary between 10 nm and a few micrometers, and
primary (MC type) and secondary (M23C6 type) carbides, preferably precipitated at the grain boundaries.

Examples of such alloys are Hastelloy, Inconel, Waspaloy, Rene, Incoloy, MP98T, TMS alloys and CMSX monocrystalline alloys.

Figure 1:
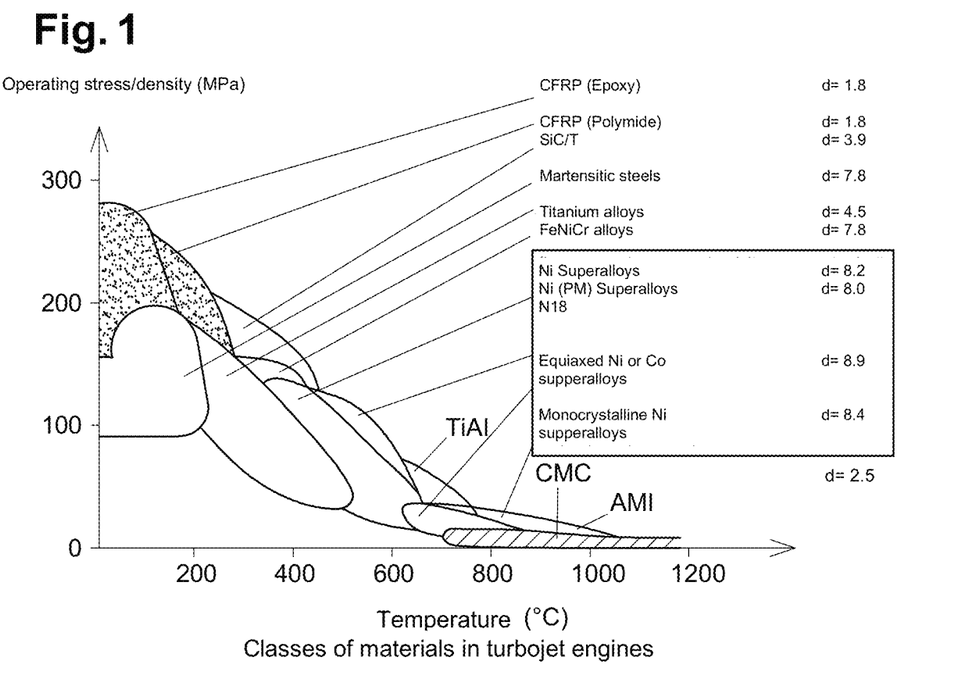

FIG. 1 illustrates a curve of stress (MPa) as a function of temperature (° C.) for different materials that can be used on a gas turbine engine for an aircraft, including superalloys. Nickel-based (Ni) superalloys are particularly targeted in the present text.

These are gamma/gamma alloys. A nickel-based alloy is defined as an alloy in which the mass percentage of nickel is predominant.

A nickel-based superalloy is considered in particular comprising, in weight percentages, 5.0 to 6.0% of aluminum, 6.0 to 9.5% of tantalum, 0 to 1.50% of titanium, 8.0 to 10.0% of cobalt, 6.0 to 7.0% of chromium, 0.30 to 0.90% of molybdenum, 5.5 to 6.5% of tungsten, 0 to 2.50% of rhenium, 0.05 to 0.15% of hafnium, 0.70 to 4.30% of platinum, 0 to 0.15% of silicon, the remainder consisting of nickel and unavoidable impurities.

Unavoidable impurities are defined as elements that are not intentionally added to the composition and are added with other elements.

Among the unavoidable impurities, mention may in particular be made of carbon© or sulfur(S).

Another example of a nickel-based superalloy comprises, in mass percentages, 6 to 8% of aluminum, 12 to 15% of cobalt, 4 to 8% of chromium, 0 to 0.2% of hafnium, 0.5 to 4% of molybdenum, 3.5 to 6% of rhenium, 4 to 6% of tantalum, 1 to 3% of titanium, 0 to 2% of tungsten, 0 to 0.1% of silicon, the remainder consisting of nickel and unavoidable impurities. Still another example is a nickel-based superalloy comprising, in weight percentages, 4.0 to 5.5% of rhenium, 3.5 to 12.5% of cobalt, 0.30 to 1.50% of molybdenum, 3.5 to 5.5% of chromium, 3.5 of 5.5% tungsten, 4.5 to 6.0% aluminum, 0.35 to 1.50% titanium, 8.0 to 10.5% of tantalum, 0.15 to 0.30% of hafnium, preferably 0.17 to 0.30% of hafnium, 0.05 to 0.15% of silicon, the remainder consisting of nickel and unavoidable impurities.

Thus, the nickel-based superalloys targeted herein are in particular those intended for the manufacture of monocrystalline components of gas turbine, such as fixed or movable vanes. As other types (phases) of superalloys, mention may be made of cobalt (Co) based superalloys.

For superalloys operating at high temperatures and exposed to corrosive environments, oxidation and/or corrosion behavior is a concern. Indeed, this involves chemical reactions of the alloying elements with oxygen to form new oxide phases, generally at the surface of the metal. If it is not attenuated, oxidation and/or corrosion could degrade the alloy over time in different ways, in particular:
sequential oxidation, cracking and spalling of the surface, causing an erosion of the alloy over time,
embrittlement of the surface by the introduction of oxide phases promoting the formation of cracks and fatigue failure,
depletion of essential alloy elements, affecting the mechanical properties of the superalloy and possibly altering its performances.

Presentation of the Disclosure

An object of the disclosure is to provide a solution to this problem of behavior to oxidation and/or corrosion and of protection to be provided, in particular when the area to be protected is difficult to access.

Therefore, a protection solution is proposed in particular which combines:
the use of a manufacturing technique using a material core comprising a ceramic, metal, or a ceramic/metal hybrid material, enabling the manufacture of hollow parts,
and the use of a protective coating based on hafnium (Hf) and/or platinum (Pt), and possibly chromium, and/or silicon and/or Yttrium, and/or mixtures thereof.

SUMMARY

More specifically, a protection method is proposed herein, to protect from oxidation and/or corrosion at least one hollow inner area of a turbine engine part made of a superalloy, the at least one hollow inner area having been formed, by at least one core made of a material comprising a ceramic or metal or a metal or ceramic hybrid material, and limited by an external surface which surrounds it, characterized in that before bringing the superalloy around the core, the external surface is coated with a coating material comprising hafnium (Hf), and/or platinum (Pt), and/or chromium (Cr) and/or silicon (Si) and/or Yttrium (Y), or a mixture thereof.

Combining the material with a technique for core coating then, thereby, for adding to the part has turned out to be effective in terms of efficiency.

In this respect, it is therefore suggested that the coating material with which the external surface is coated favorably comprises:
a layer at least nanometric containing hafnium, or hafnium is finally present between 0.3 and 5 w %, and possibly 15 w %, at the surface of the hollow inner area, in the superalloy, and/or
a layer at least micrometric containing platinum, or platinum is finally present between 10 and 80 w % at the surface of the hollow inner area, in the superalloy, or a mixture of at least hafnium and platinum, across a thickness at least micrometric, which can be usefully comprised between 1 μm and 100 μm, and/or at least one layer containing Cr and/or Si and/or Y across a thickness at least nanometric, which can be usefully comprised between 20 nm and 100 μm, or chromium is present between 2 and 30 w % at the surface of the superalloy of the hollow inner area of the final part, and/or silicon is present between 0.2 and 10 w % at the surface of the superalloy of the hollow inner area of the final part, or Yttrium is finally present between 0.3 and 15 w % at the surface of the superalloy of the hollow inner area of the final part.

For all purposes, it is specified that in the present text "w % at the surface of (or in) the superalloy" will indicate in this case the weight percentage of the element in the total mass of superalloy thus charged, after diffusion of the core towards the part of all or part of the considered reactive elements (Hf, Pt, Cr, Si, Y) or at least partial mixture thereof.

Preferably, hafnium will be predominant in w % in the possible layer at least nanometric containing hafnium, the same applies for platinum in the possible layer at least micrometric containing platinum, and for Cr and/or Si and/or Y in the or their layer.

In the present text, "predominant" means that it consists of the main constituent in w % in the layer. There can be more than 50%.

In the coating material with which the external surface of the core is coated:

of a Cr layer is provided, its thickness will be smaller than 10 μm, and possibly smaller than 2 μm, and/or of a Si layer is provided, its thickness will be limited between 50 and 500 nm, and still preferably between 100 and 200 nm.

According to the assumption hereinabove of bringing at least some of the aforementioned reactive elements (Hf, Pt, Cr, Si, Y), or at least a partial mixture thereof, it is even suggested, to further optimize the efficiency of the solution, that:

the layer at least nanometric of hafnium with which the external surface is coated with the coating material is present, at the surface of the core, across a thickness comprised between 50 nm and 800 nm, or hafnium is finally present between 0.3 and 15 w % at the surface of the hollow inner area of the part, in the superalloy, and/or the layer at least micrometric of platinum has a thickness comprised between 1 μm and 5 μm at the external surface of the core, or platinum is present between 15 and 60 w % at the surface of the superalloy of the hollow inner area of the final part, and/or the at least one layer containing Cr and/or Si and/or Y has a thickness comprised between 30 nm and 10 μm, or chromium is present between 4 and 10 w % at the surface of the superalloy of the hollow inner area of the final part, or silicon is present between 0.2 and 2 w % at the surface of the superalloy of the hollow inner area of the final part, or yttrium is present between 0.3 and 15 w % at the surface of the superalloy of the hollow inner area of the final part.

After coating the external surface of the core with the retained coating material, the molten superalloy will advantageously be brought into contact with the coated external surface.

Thus, part of the disclosure consists in using a core as mentioned before as a source of local modification of the chemistry of the alloy of the part, during a hollow part manufacturing process, advantageously according to the molten wax (or lost wax) technique, for example for forming cooling channels in a turbine engine blade for an aircraft.

Among the advantages of using such a core as a substrate for making a protective coating for the inner cavity of a hollow part, in particular hollow blade cavities, one could point out that the cavity has a modified surface chemistry at the surface to increase resistance to oxidation and corrosion of the material, that the coating can be uniform inside the cavity, that the traditional lost wax casting process does not is not necessarily modified, that no deposition process subsequent to casting is absolutely necessary to make this coating.

Thus, one objective herein is to adapt the chemical composition of the superalloy at the surface in order to increase the resistance to the environment of an inner portion of a hollow part, such as an inner cavity of a turbine hollow vane.

The solution proposed herein allows doing so, bearing in mind that:

10 nanometric (nm; $10^{-9}$ m) means: thickness 10 nm≤e<1,000 nm, micrometric or micronic (μm; $10^{-6}$ m) means: thickness 0.5 μm≤e<1,000 μm.

To promote bonding of the or of the layer(s) on the considered surface of the core, it has also been suggested that after coating the external surface of the core with the coating material, but before bringing the superalloy around this core, the coating of the external surface is diffused between 800° C. and 1,250° C., under a secondary vacuum.

A secondary vacuum is defined as a space where a pressure lower than 1 Pa prevails, for example a pressure of about $10^{-1}$ Pa, within a 10% margin.

Another encountered difficulty related to the reactivity between the liquid metal of the part to be manufactured and the elements deposited at the surface of the core. A suitable deposition 20 method and/or a diffusion heat treatment should allow overcoming this difficulty.

Also, it is further suggested that, the provision of the superalloy around the core comprising dissolving the superalloy, a diffusion of the coating material in the core is initiated by heat treatment when dissolving the superalloy.

The solution treatment will consist in heating the alloy up to an appropriate temperature, maintaining this temperature long enough to cause the transformation of one or more constituent(s) into a solid solution and cooling it fast enough to maintain these constituents in the solution. Possible subsequent heat treatments by precipitation already allow controlling the release of these constituents in a natural (room temperature) or artificial (higher temperatures) state.

The heating temperature of the superalloy for the solution treatment may favorably be between 1,100° C. and 1,375° C., depending on the alloy.

As advantages, it can be noted that these solution treatments or solution and hardening by precipitation ageing treatments should allow improving the characteristics such as the mechanical strength at room and/or high temperature (over 600° C.), corrosion resistance and oxidation resistance.

In a preferred application related to vanes (fixed vanes, also called distributors or rectifiers, or movable vanes, in particular monocrystalline) of an aeronautical turbine or compressor, it is moreover proposed that the superalloy is nickel-based.

With such a material, one expects the advantage of combining high creep resistance at high temperature as well as resistance to oxidation and corrosion.

Indeed, nickel-based superalloys are materials with an austenitic nickel-based matrix γ (face-centered cubic, therefore rather ductile) reinforced by hardening precipitates γ' (also with a FCC structure, but having an ordered atomic nature) consistent with the matrix, i.e. having an atomic mesh very close thereto.

The compound γ' of formula $Ni_3(Al, Ti)$ further has, thanks to its ordered nature, the remarkable property of having a mechanical strength which increases with temperature up to about 800° C. The very strong consistency between γ/γ' confers a very high mechanical strength of nickel-based superalloys at hot temperature, which itself depends on the level of hardening precipitates, which has led to:

alloys with high resistance up to 700° C., but whose resistance decreases sharply beyond 800° C., which makes them suitable for hot forging (beyond 1,000° C.), alloys having an intermediate resistance up to 700° C. and a good mechanical strength at very high temperatures (up to 1,100° C.). These alloys are used in precision casting.

Yet, the efficiency of an (aeronautical) gas turbine is highly dependent on its operating temperature, this temperature being limited by the resistance of the materials that compose it at hot temperature. Nickel-based superalloys are currently the materials of choice for the hot parts of gas turbines, located in particular at the outlet of the combustion chamber. These materials have the advantages of combining both high creep resistance at high temperature as well as a satisfactory resistance to oxidation and corrosion. Thus, some grades of nickel-based superalloys are used for the manufacture of fixed (such as distributors, ring segments) or moving (such as turbine vanes) monocrystalline parts. The development of new superalloy grades with the aim of improving the mechanical properties at high temperature has led, over the years, to a significant reduction in the chromium content. Thus, for example, the first-generation AM1 alloy contained 7.5 w % of Cr, the second-generation CMSX-4 contained 6.5 w %, and the corresponding third-generation alloy, called CMSX-10, contained 2w % of Cr.

The decrease in the concentration of this element, ensuring the resistance to oxidation and corrosion of superalloys, has led to greater sensitivity of superalloys to the environment, increasingly requiring the use of a protective coating.

Thus, coatings can be used in order to improve the resistance to the oxidizing and/or corrosive environment of the combustion gases and to act as a thermal insulator in order to reduce the temperature imparted to the superalloy substrate. This is particularly the case for the protection of the outer portions of high-pressure turbine blades subjected to high stresses and temperatures.

Coatings are usually composed of two layers. The first layer, deposited at the surface of the alloy then diffused, generally called bonding layer or sub-layer, is composed of an aluminoforming alloy, for example an alloy of the MCrAlY type (M=Ni and/or Co) or a platinum-modified nickel aluminide. This layer can have two essential roles. The first one is to protect the superalloy from oxidation and corrosion in the case where this coating is used alone. The second one can be to ensure bonding of a second layer, generally called a thermal barrier, in the case where a porous coating consisting of a ceramic (for example of yttria zirconia) is used.

The aforementioned blades of aeronautical turbine engines may be hollow in order to be able to be cooled through the use of inner channels.

As already indicated, the cooling channels can be obtained during the process of making such a blade by using cores as suggested herein, therefore containing at least one ceramic or metal or a metal and ceramic hybrid (composite) material, and having for example the shape of the cooling channels to be obtained.

As a core containing ceramic, mention may be made of a core predominantly consisting of amorphous silica (~80% by weight, within a 10% margin) and of cristobalite (~20% by weight, within a 10% margin). Different elements can be added depending on the desired properties such as alumina, zirconia, oxides or alkaline ions ($CaCO_3$ or $MgO_2$).

Core heat treatment cycles can be carried out such as debinding and sintering (T~1,200° C., within a 10% margin).

Once the core is ready, the metal of the part to be made (herein the retained superalloy) can then be cast into a mold, called a shell, so as to surround the core. Afterwards, the core is dissolved, allowing obtaining the intended part, such as a blade hollow structure.

In the case of such a blade, its hollow portions are henceforth exposed to the environment, and can be all the more sensitive to this environment if the alloy used for the manufacture of the blade is a latest-generation alloy containing a small amount of chromium.

Hence, as mentioned hereinbefore, it might be necessary to deposit a coating inside the cavity(ies) of the blade in order to protect this/these from this environment.

Yet, while depositing a protective coating over a blade, and more generally over a turbine engine part made of a superalloy, is known, this is done just to protect the external portion of a part, in this instance of the blade. Indeed, the implementation process is not suited to perform coating of the inside of a hollow part, in particular of a blade, which can have a width of a few hundred microns. The use of usual deposition processes, such as physical vapor deposition (PVD), electroplating or chemical vapor deposition (CVD) turns out to be difficult to obtain a suitable protective coating.

Also, a part having the characteristics hereinafter is not a priori known.

Consequently, besides the method that has just been presented, the disclosure also relates to a monocrystalline part of a gas turbine engine for an aircraft made of a superalloy, the part having:

at least one hollow inner area and, over at least one portion of the surface which delimits the hollow inner area, a coating limited to a non-zero depth smaller than or equal to 1mm, and comprising a concentration of hafnium, and/or platinum, and/or chromium and/or silicon and/or yttrium, or a mixture thereof.

Given the foregoing and the quality and efficiency of the manufacturing process (diffusion via a core, as mentioned before), the expected protection against oxidation and/or corrosion of this hollow inner area may even be such that, in the obtained final part, the surface concentration of hafnium, and/or platinum, and/or chromium and/or silicon and/or Yttrium, or a mixture thereof in the superalloy, at its external coating, is limited to a non-zero depth, smaller than or equal to 0.5 mm.

For a more optimized efficiency of the compositions of the protective elements at the surface of the final part, it is recommended that the concentration, at the surface, in the superalloy is:
- between 0.3 and 10 and possibly 15 w %, and preferably between 0.4 and 4.5 w %, for hafnium, and/or
- between 10 and 90 w %, and preferably between 15 and 60 w %, for platinum, and/or
- between 2 and 30 w % for chromium, and/or
- between 0.2 and 10 w % for silicon, and/or
- between 0.3 and 10 and possibly 15 w % for yttrium.

In terms of application and herein again taking into account the foregoing, it may usefully be provided that the obtained part:
- defines a fixed or movable turbine blade of the turbine engine in which the at least one hollow inner area is an inner channel of the blade communicating with the outside and adapted to receive a fluid to internally cool the blade, and/or
- that its superalloy is nickel-based.

DESCRIPTION OF THE DRAWINGS

FIG. 1 represents a curve of stress (MPa) as a function of temperature (C) for different materials, including superalloys, FIG. 2 schematically represents, in a very local section, the diffusion of the coating applied over the core, which has therefore partially diffused in the area (the closest to the core/part interface) of the part made of superalloy, FIG. 3 schematically represents a portion of a hollow blade of an aircraft turbine engine, FIG. 4 represents a section according to IV-IV of FIG. 3, FIG. 5 schematically represents a portion of the core for the aforementioned hollow blade, and FIG. 6 schematically represents a variant of the enlarged area of the surface of the core illustrated in FIG. 5.

DETAILED DESCRIPTION

The following description, provided as a non-limiting example, relates to a fixed or movable blade of a turbine engine turbine for an aircraft.

As explained in EP1754555, such a blade can be obtained by casting a molten alloy in a mold according to the lost wax casting technique.

In particular, to make inside the blade at least one inner cavity for the circulation of a cooling fluid (typically air), the inner core (around which the material of the blade will be cast afterwards) will comprise a ceramic material and/or metal or a metal and ceramic hybrid material.

Thus, the core can have a porous structure and be made from a mixture consisting of a refractory charge in the form of particles and a more or less complex organic fraction forming a binder. Examples of compositions are given in the patents EP 328 452, FR 2 371 257 or FR 2 785 836.

As an example of a ceramic composition of the core, mention may be made of a composition advantageously derived from a mixture of silica powder, such as molten or vitreous silica, zircon and others, such as favorably cristobalite, alumina or zirconia. Examples of ceramic compositions can be found in the U.S. Pat. No. 5,043,014. In particular, it consists of a mixture of silica, zircon and cristobalite, particularly in respective proportions of 70-80/15-25/1-5 in % by weight, even more particularly respective proportions in % by weight of 77/20/3. The silica powder may have different grain-size distributions.

As an example of a metal composition, mention may be made of a foundry core made of a refractory metal alloy, which may typically be a molybdenum alloy. Such a refractory metal degrading easily under an oxidizing atmosphere and being soluble in the superalloy, it might therefore be necessary to protect the metal against oxidation and erosion. This protection will be favorably ensured by a metal and/or ceramic multilayer coating with specific properties: antioxidant, anti-erosion, diffusion barrier . . . inter alia. In general, as a material, marked 28 FIG. 6, for protection against oxidation of molybdenum and its alloys, silicides are recommended herein (MoSi2, up to 1,600° C. or MoSi2+Cr, Cr—B, Cr—B—Al, Sn—Al) and silicide complexes (Si-CrFe, up to 1,500° C.). There are others based on aluminides, ceramics (Al2O3, ZrO2+HfO2/Y2O3, Al—Cr, Al—Si, Sn—Al) and metals (Cr, Ni, noble metals, alloys . . . ) made by various techniques (CVD—Chemical Vapor Deposition—, PVD—Physical Vapor Deposition—, Plasma . . . ).

The aforementioned coating suggested by the disclosure and referenced 22 hereinafter will be added, in the case of such a metal core (at the heart), either on top of the above-mentioned protective material, or directly over (at the heart of) the metal core itself, if it has not been coated beforehand with such a protective material.

As an example of a bi-material hybrid core, mention may be made of a core consisting of a first material predominantly based on silica/zircon (more specifically the heart of the core) obtained for example by injection, machining or additive manufacturing and of a second material containing reactive elements (at the surface of the core) and which can be obtained by over-injection or additive manufacturing (projection of drops of material or melting of wire throughout a heating nozzle).

Regardless of the retained choice of the core (with a coated or uncoated heart), once the latter has been manufactured, according to the disclosure, it will be covered with the suggested anti-oxidation and/or anti-corrosion protective coating; after which it is possible to mold the superalloy over the core covered with the protective coating of the disclosure, and thus protect the inner portions of some aeronautical turbine engine parts made of a superalloy, such as vanes in particular, from oxidation and/or corrosion.

According to one aspect, the disclosure therefore consists in having used a core coated with reactive elements as a source of local modification of the chemistry of the superalloy, the objective having been to adapt the chemical composition of the superalloy in order to increase the resistance to the environment of the inner portion of the considered part: the inner cavity(ies) of a blade, in the retained preferred example.

Figure 5:
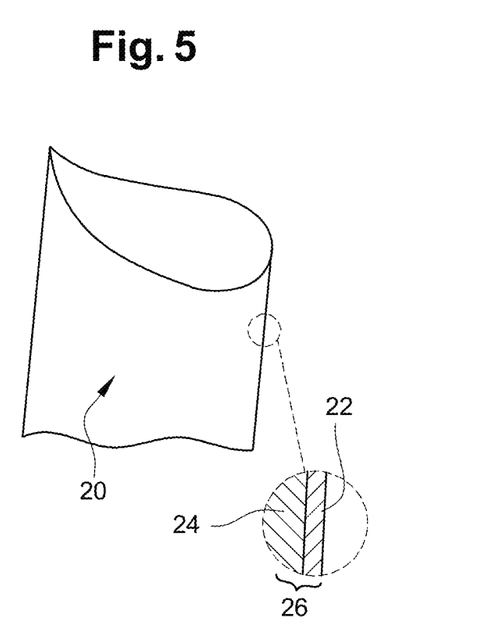
Figure 6:
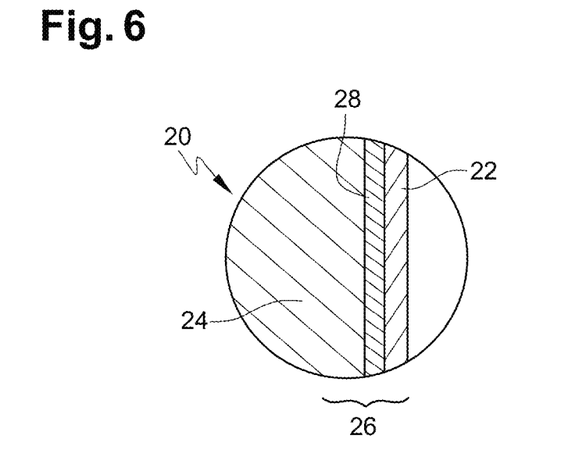

Hence, to make these "reactive elements", one will therefore have, before bringing the superalloy around the core, coated the external surface of this core, marked 26 FIGS. 5, 6 and which is adapted to the shape of the final part 7 to be manufactured, with a coating material 22 comprising at least hafnium (Hf), and/or platinum (Hf), and/or chromium and/or silicon and/or yttrium, or a mixture thereof.

As regards the core 20 itself, its heart 24 therefore contains a ceramic or metal or a metal/ceramic hybrid material. Examples of a ceramic composition, of a metal composition or of a hybrid (or bi-material) ceramic/metal composition of the heart 24 of the core 20 have been disclosed hereinbefore and are amongst the most suitable ones.

As already explained, around this heart 24, possibly already protected by a first protective coating 28, a substantial increase of the resistance of the surface to the environment of the final part 2 (cf. FIGS. 2-4), therefore of the surface chemistry of the superalloy 40 that forms it (essentially; cf. FIG. 2), has been noticed when coating the external surface of the core 20 with, as an external coating, a material comprising (possibly with a mixture of the elements hereinafter):
- at least one layer at least nanometric of hafnium (Hf), and/or
- at least one layer at least micronic of platinum (Pt), or
- at least one layer at least nanometric containing Cr and/or Si and/or Y, the preferred thicknesses or w % at the surface of the superalloy of the hollow inner area of the final part having already been specified, before in the text.

Nonetheless, to combine mechanical performance and optimizations of the amounts and of the implementation process, one could prefer, as also already specified:
- that the thickness e1 of the Hf layer is 20 nm≤e1≤900 nm, and even 50 nm≤e1≤500 nm, and/or
- that the thickness e2 of the Pt layer is 1 μm≤e2≤15 μm, and even 1 μm≤e2≤5 μm.

In particular, depositing between 1 μm and 5 μm of platinum and 0.5 μm of Hf (within a 10% margin) has turned out to be a relevant solution, considering the targeted aims.

Given the nature of the aforementioned coating to be deposited (marked 1 in the figures), the mentioned elements can be deposited by one or several process(es), as follows:
- the layer(s) or elements Pt and/or: Hf, possibly Cr, Si, Y (alone or mixed) can be made in the same deposition machine and be deposited by one amongst the physical vapor deposition (PVD) processes such as: EBPVD, Joule evaporation, pulsed laser ablation or cathodic spraying,
- the layer or element Pt can be deposited by electrolytic deposition provided that the composition of the core is doped with electrically-conductive elements, such as metal or carbon,
- the layer(s) or elements Hf and/or Cr, Si or Y can be deposited by chemical vapor deposition CVD (PECVD, LPCVD, UHVCVD, APCVD, ALCVD, UHVCV . . . ).

After the coating deposition(s) performed at the surface of the core, a diffusion treatment may be carried out in order to make its aforementioned coating material(s) diffuse in the core, and thus promote the profitable supply of all or part of these elements.

It is possible to provide for this diffusion treatment in the core to be carried out when dissolving the superalloy, which can be done during a heat treatment.

The temperatures to promote the diffusion of the aforementioned reactive elements Pt and/or Hf, Cr, Si, Y will favorably be comprised between 800° C. and 1,250° C., under a secondary vacuum, typically $10^{-6} \times 10^5$ Pa, within a 10% margin.

Whether there has been a step of diffusion, towards the inside of the core, of the aforementioned layer(s) or elements, or not, it is during casting of the superalloy of the part to be manufactured around the core enriched at the surface by its coating that the superalloy will be able to react with the aforementioned components Hf, and/or Pt, and/or Cr and/or Si and/or Y.

This casting of the superalloy of the part to be manufactured around the core can be favorably followed by a heat treatment in order to best promote the diffusion of the coating component(s) of the core, schematized in 20 FIGS. 5-6, towards the superalloy of the part, marked 2 in the illustrative figures.

The conditions may be the same as before: between 800° C. and 1,250° C., within a 10% margin, under a secondary vacuum, typically $10^{-1}$ Pa, within a 10% margin.

Figure 2:
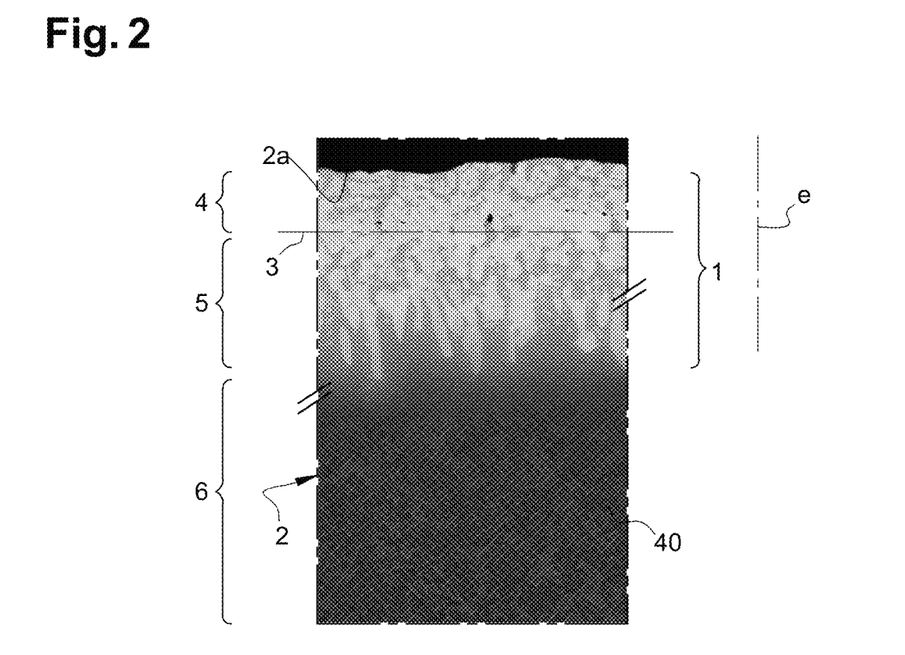

FIG. 2 schematically illustrates the effect of enrichment/diffusion on the aforementioned coating 1, which coating has therefore, in the figure, partially diffused into the upper area (the closest to the inner surface 2a) of the part 2 made of a superalloy.

The limit or the interface that could be considered to exist between the superalloy 40 itself and the coating 1 has been identified in 3, assuming that there would be no heat treatment of diffusion.

Hence, if there has been enrichment with diffusion, one will find, across the thickness of the part 2, and starting from its inner surface 2a:
- first a first layer 4 of the coating 1, not or relatively barely diffused, predominantly consisting of the added or enrichment element(s) in Pt and/or Hf, Cr, Si, Y transmitted to the part 2 during casting of the superalloy 40 over the core 20 entirely or partially coated with these same elements (generally marked 22 FIG. 5 or 6),
- then, deeper down, a layer 5 of the added or enrichment elements, intimately mixed with the superalloy 40; this is the layer where the elements have (further) diffused into the superalloy, forming the most deeply anchored portion of the actual coating 1 for protection against oxidation and/or corrosion,
- then an area 6 (which sinks into the part) formed from the actual mass of superalloy 40.

FIG. 5 or 6, the coating 22 at the external surface 26 of the core, or model (of a blade in the example), 20 has been identified as well dissociated from the base material 24, or core, of this core, while the separation is not really so neat.

As regards the heat treatment of dissolving the superalloy, it should be noted that the solidifying nickel-based superalloys can be heat-treated to obtain the desired distribution and size of the different phases. The first heat treatment (T) can be a microstructure homogenization treatment which aims to dissolve the γ' phase precipitates and eliminate the γ/γ' eutectic phases or significantly reduce their volume fraction. This treatment is carried out at a temperature higher than the solvus temperature of the γ' phase and lower than the starting melting temperature of the superalloy (Tsolidus). Afterwards, quenching can be carried out at the end of this first heat treatment to obtain a fine and homogeneous dispersion of the γ' precipitates. Afterwards, quenching heat treatments may be carried out in two steps, at temperatures lower than the solvus temperature of the γ' phase: During a first step (R1), to enlarge the γ' precipitates and obtain the desired size, then during a second step (R2), to increase the volume fraction of this phase up to about 70% at room temperature.

Example of heat treatments:
Superalloy AM1:
Treatment at 1,300° C. for 3 hours under partial pressure of argon or under vacuum followed by gas quenching (argon).
R1: 1,100° C. for 5 h in air,
R2: 870° C. for 16 h in air
Superalloy CMSX-4:
Treatment in stages from 1,277° C. to 1,321° C. in 16 h and a 2 h stage at 1,321° C. under partial pressure of argon or under vacuum followed by gas quenching (argon).
R1: 1,100° C. for 4 h in air
R2: 870° C. for 20 h in air.

Figure 3:
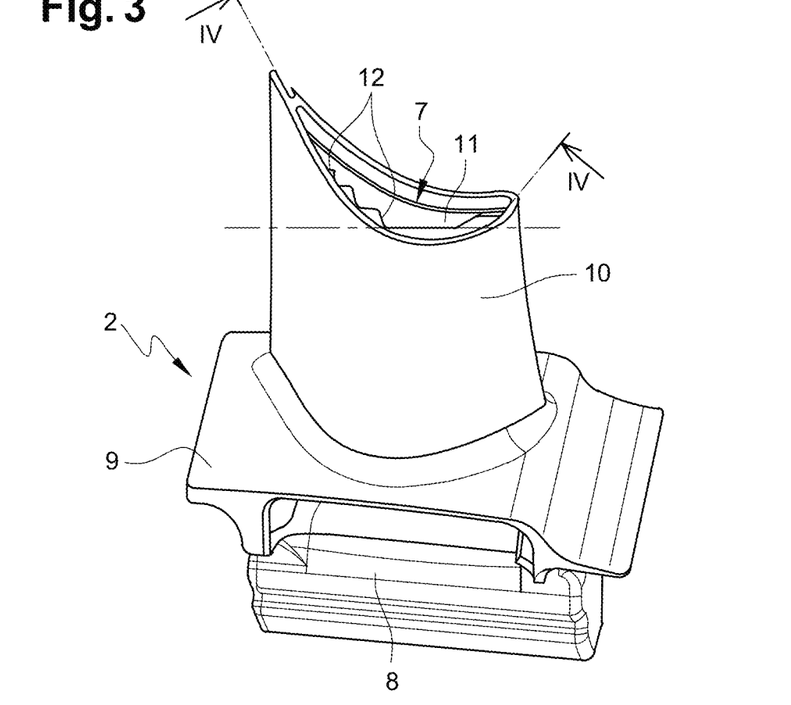
Figure 4:
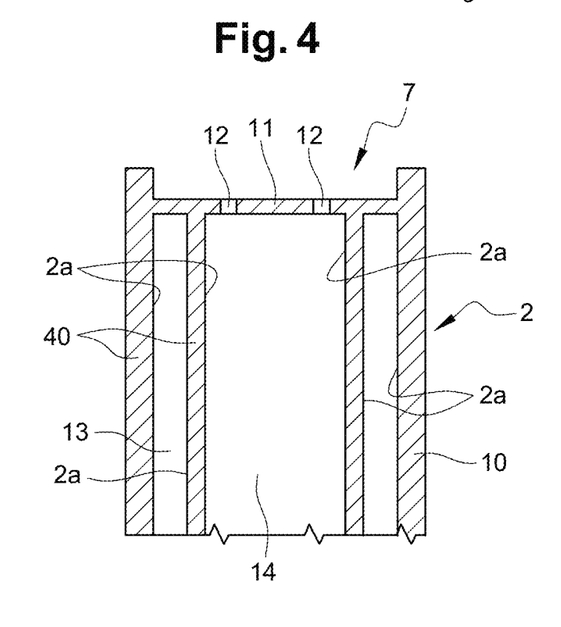

FIG. 3 schematizes an example of a hollow blade, of the "bathtub" type, but the presence or absence of such a "bathtub" (cavity at the top of the blade open radially outwards) is irrelevant. On the other hand, it consists of a hollow blade 2. In the figure, one can identify the root 8 of the blade by which it is mounted on a turbine rotor, the platform 9 and the blade 10. The blade 10 is hollow (cf. section FIG. 4) and comprises the bathtub 7 at its top opposite to the platform. The bathtub is delimited laterally by the wall of the blade and the bottom is formed by a bathtub bottom wall 11, perpendicular to the radial axis of the blade. This bottom wall 11 which can be seen in section in FIG. 4 is crossed by orifices 12 which communicate with the inner cavities 13, 14 of the blade to evacuate a portion of the cooling fluid from the latter. In turn, this fluid is evacuated into the hot gas flow path through the clearance existing between the top and the annular surface of the stator located radially opposite thereto.

Hence, the solution of the disclosure will have allowed protecting the inner surfaces 2*a* of these cavities 13, 14 by having locally enriched in Pt and/or Hf, possibly Cr, and/or Si, and/or Y, the inner surface 2*a* of the superalloy 40 in which the blade 2, and in this instance at least the hollow blade 10, is made.

Finally, it should be noted that the disclosure has allowed:
- defining the elements and amounts to be deposited over the final part, in particular in the case of turbine engine blade channels to protect them from oxidation/corrosion,
- using a suitable deposition method to deposit these desired elements at the surface of intermediate feed cores,
- carrying out a suitable heat treatment for the diffusion of the desired elements from the core towards the surface of the metal of the part to be enriched at the surface to protect it.

The invention claimed is:

1. A protection method, for protecting at least one hollow inner area of a turbine engine part made of a superalloy from oxidation and/or corrosion, said at least one hollow inner area having been formed by means of at least one core:
   - made of a material comprising a ceramic and/or metal or a metal and ceramic hybrid material, and
   - limited by an external surface which surrounds the at least one core, the method comprising the steps of:
   - before bringing the superalloy around the at least one core, coating said external surface with a coating material comprising hafnium (Hf), and/or platinum (Pt), and/or chromium (Cr) and/or silicon (Si) and/or Yttrium (Y), or a mixture thereof;
   - before bringing the superalloy around the at least one core, diffusing said coating material in the at least one core between 800° C. and 1,250° C., under a pressure lower than 1 Pa; and
   - after coating said external surface of the at least one core with the coating material, bringing the superalloy in a molten state in contact with said coated external surface.

2. The protection method according to claim 1, wherein the coating material with which said external surface is coated comprises:
   a nanometric layer containing hafnium (Hf), or wherein hafnium is present between 0.3 and 15 w %, on an entire surface of the hollow inner area, in the superalloy.

3. The protection method according to claim 2, wherein:
   the nanometric layer of or containing hafnium has a thickness between 50 nm and 800 nm, or hafnium is present between 0.3 and 5w % at the surface of the hollow inner area, in the superalloy.

4. The protection method according to claim 1, wherein bringing the superalloy around the at least one core comprises dissolving the superalloy, wherein the diffusing of the coating material in the at least one core is initiated when dissolving the superalloy.

5. The protection method according to claim 1, wherein the superalloy is nickel-based.

6. The protection method according to claim 1, wherein the coating material with which said external surface is coated comprises:
   a micrometric layer containing platinum (Pt), or wherein platinum is present between 10 and 80 w %, on an entire surface of the hollow inner area, in the superalloy.

7. The protection method according to claim 1, wherein the coating material with which said external surface is coated comprises:
   a mixture of at least hafnium (Hf) and platinum (Pt), across a micrometric thickness.

8. The protection method according to claim 1, wherein the coating material with which said external surface is coated comprises: at least one layer containing Cr and/or Si and/or Y across a nanometric thickness, or chromium is present between 2 and 30 w % at an entire surface of the superalloy of the hollow inner area of the turbine engine part, or silicon is present between 0.2 and 10 w % at the entire surface of the superalloy of the hollow inner area of the turbine engine part, or Yttrium is present between 0.3 and 15 w % at the entire surface of the superalloy of the hollow inner area of the turbine engine part.

9. The protection method according to claim 6, wherein:
   the micrometric layer containing platinum has a thickness between 1 μm and 5 μm at the external surface of the at least one core, or platinum is present between 15 and 60 w % at an entire surface of the hollow inner area, in the superalloy,
   said at least one layer containing Cr and/or Si and/or Y and having a thickness comprised between 30 nm and 10 μm, or chromium is present between 4 and 10 w % at the surface of the superalloy of the hollow inner area of the turbine engine, or silicon is present between 0.2 and 2 w % at the surface of the superalloy of the hollow inner area of the turbine engine part.

* * * * *